United States Patent
Huloux

[11] Patent Number: 5,933,415
[45] Date of Patent: Aug. 3, 1999

[54] CIRCUIT FOR TRANSMITTING BINARY DATA ON THE ELECTRIC NETWORK USING SEVERAL TRANSMISSION CHANNELS

[75] Inventor: Joël Huloux, Le Versoud, France

[73] Assignee: SGS-Thomson Microelectronics S.A., Saint Genis, France

[21] Appl. No.: 08/678,488

[22] Filed: Jul. 9, 1996

[30] Foreign Application Priority Data

Jul. 13, 1995 [FR] France .................................. 95 08762

[51] Int. Cl.[6] .............................. H04L 27/10; H04B 3/46
[52] U.S. Cl. .......................... 370/252; 370/295; 370/343; 375/222
[58] Field of Search .................... 340/310.01, 310.02, 340/310.06; 370/431, 437, 462, 480, 482, 489, 295, 238, 252; 375/222, 272, 334, 335; 379/93.01, 93.05, 93.06; 455/62

[56] References Cited

U.S. PATENT DOCUMENTS

| | | | |
|---|---|---|---|
| 4,057,793 | 11/1977 | Johnson et al. | 340/310.07 |
| 4,521,891 | 6/1985 | Biba et al. | |
| 4,556,866 | 12/1985 | Gorecki | 340/310.02 |
| 4,580,276 | 4/1986 | Andruzzi, Jr. et al. | 375/269 |
| 4,617,656 | 10/1986 | Kobayaashi et al. | 370/445 |
| 4,656,645 | 4/1987 | Kaneko . | |
| 4,715,045 | 12/1987 | Lewis et al. . | |
| 4,797,947 | 1/1989 | Labedz . | |
| 4,809,296 | 2/1989 | Braun et al. | 375/1 |
| 4,817,087 | 3/1989 | Yamada | 370/445 |
| 5,168,510 | 12/1992 | Hill | 375/40 |
| 5,185,591 | 2/1993 | Shuey | 340/310 A |
| 5,313,492 | 5/1994 | Hashimoto et al. | 375/222 |
| 5,448,593 | 9/1995 | Hill | 375/267 |
| 5,603,082 | 2/1997 | Hamabe . | |
| 5,708,973 | 1/1998 | Ritter | 455/62 |
| 5,802,446 | 9/1998 | Giorgi et al. | 455/69 |

OTHER PUBLICATIONS

French Search Report from French Patent Application 95 08762, filed Jul. 13, 1995.
Patent Abstracts of Japan, vol. 011, No. 314 (E–549), Oct. 13, 1987 & JP–A–62 107538 (Hitachi Chem Co. Ltd.).

Primary Examiner—Chau Nguyen
Assistant Examiner—Soon-Dong Hyun
Attorney, Agent, or Firm—Wolf, Greenfield & Sacks, P.C.

[57] ABSTRACT

The present invention relates to a circuit for transmitting binary data on an electric network. The circuit includes a modulator, a demodulator and a digital circuit for controlling the modem and interpreting binary data. The circuit further includes a circuit for allocating a transmission channel to a communication and means for selecting, among several channels, an idle channel.

44 Claims, 2 Drawing Sheets

CIRCUIT FOR TRANSMITTING BINARY DATA ON THE ELECTRIC NETWORK USING SEVERAL TRANSMISSION CHANNELS

BACKGROUND OF THE INVENTION

1. Field of the Invention

This invention relates to the field of digital modulators/demodulators (modems) using an electric network as a transmitting medium. The invention more specifically relates to allocating a channel to a transmission between at least two modems connected to the same electric network.

2. Discussion of the Related Art

Modems using an electric network as a transmitting medium are used in particular in home automation applications. In such applications, different electric devices (heating, lighting, alarm, etc.) connected to the network are associated with modems and thus are likely to be controlled by a central control station according to a timed scenario and/or various types of detectors (temperature, fire, inundation, house-breaking, etc.). The central station is generally associated with a system for receiving instructions transmitted by the telephone network so as to control or program scenarios remotely from the home automation installation.

In such an installation, the electric network at 50 or 60 Hz is the transmitting medium. A frequency shift keying (FSK) modulation is generally used. The data to be transmitted is encoded in a binary form, then converted into an analog signal, for example, as samples of portions of one or the other of two frequencies fa and fb which constitute the signal to be transmitted on the network. The amplitude of the modulation is low (around one volt) with respect to the voltage of the power line so as not to harm the supply of the different devices.

Installations using an amplitude shift keying modulation can also be found. Here, the binary data is converted into an analog signal, as samples of portions of a frequency which constitutes the signal to be transmitted on the network.

A disadvantage of existing modems is that they do not allow the presence of several simultaneous communications on the same network between different modems. Indeed, as these communications are all transmitted by FSK modulators provided for operating on two frequencies $f_a$ and $f_b$, the messages are then mixed and cannot be properly decoed any longer.

Another disadvantage of existing modems is associated with the use of the electric network as a transmitting medium. Indeed, the signal received by a given modem is likely to be strongly attenuated due to the transmitting medium used. This attenuation, which is variable and uncontrollable, essentially has two causes.

First, the network impedance at the frequencies used for the modulation varies according to the loads it supplies. This variation of impedance which is substantially inductive and, for example, varies between 1.5 and 80 Ω at the frequency of 100 kHz is uncontrollable since it depends on the loads supplied in the installation involved and on the impedance of the electricity dispensing transformer to which the installation is connected. Moreover, the network impedance depends on the loads supplied by all the installations that the transformer supplies. The attenuation due to these variations of impedance is, for example, between approximately 2 and 40 dB for a typically resistive load.

Second, the electric connections attenuate the signal. This attenuation is even more significant if the signal transmitted by a given modem is addressed to a modem that is connected to another branch of the electric circuit. In other words, the crossing of the prepatch panel and of the fuses and circuit-breakers it includes causes a significant attenuation of the signal (of approximately 20 to 30 dB).

SUMMARY OF THE INVENTION

It is an object of the present invention to overcome these disadvantages by allowing the use of several transmission channels by a same modem.

It is also an object of the present invention to establish simultaneous communications between different modems connected on the same network.

It is a further object of the present invention to automatically select the best transmission channel.

It is an object of the present invention to provide an allocation circuit which requires no alteration of the structure of the existing modems.

A further object of the present invention is to have the allocation circuits, which have a different number of channels, be compatible with one another without any intervention.

It is also an object of the present invention to make the transmission channels user-programmable.

To achieve these objects, an embodiment of the present invention provides a circuit for transmitting binary data on the electric network of the type including a modulator, a demodulator and a digital circuit for controlling the modem and interpreting the binary data, and including a circuit for allocating a transmission channel to a connunication and means for selecting, from among several channels, an idle channel.

According to an embodiment of the present invention, said allocation circuit includes a device for selecting, from among several idle channels, the one with the best transmission level. The selection of the channel is performed, on the receiver modem side, during a frame for establishing a communication sent on all idle channels by a transmitter modem. The selection device issues to said control circuit a signal indicating the channel selected.

According to an embodiment of the present invention, said selection device controls, on the transmitting side, a device for modulating, on at least one frequency selected from among several high frequencies defining said transmission channels, a signal already modulated by said modulator and, on the receive side, a device for demodulating a signal received on said channel selected for its best transmission level.

According to an embodiment of the present invention, said frame for establishing a commnication includes a sequence containing the duration of the message about to be sent by the transmitter modem.

According to an embodiment of the present invention, said frame for establishing a comunication includes a sequence containing the respective addresses of the modem transmitting the frame and of at least one receiver modem to which it is addressed.

According to an embodiment of the present invention, the transmission circuit transmits, upon receiving a frame for establishing a commaication which was addressed to it, an answer frame to the transmitter modem, said answer frame being transmitted only on the channel that it has selected upon receiving said frame for establishing the ounication and having a format similar to the latter.

According to an embodiment of the present invention, said frame for establishing a communication begins with a pseudorandom sequence with a predetermined duration selected according to the duration required for the selection of a channel by said allocation circuit, said pseudo-random sequence being followed by a predetermined sequence enabling said control circuit to identify the frame as a frame for establishing a comunication.

According to an embodiment of the present invention, said control circuit issues to said allocation circuit a configuration signal respectively indicating the idle and busy channels to the allocation circuit.

According to an embodiment of the present invention, said control circuit assumes that a channel becomes idle at the end of the duration contained in the frame which has established the comunication on this channel.

According to an embodiment of the present invention, said modulator is a frequency shift keying modulator, said demodulator being a frequency shift keying demodulator and each high frequency defining a transmission channel being chosen to have, with respect to the two high frequencies next to it, a distance larger than the distance between the two frequencies of the FSK modulation.

BRIEF DESCRIPTION OF THE DRAWINGS

These objects, features and advantages of preferred, non-limiting embodiments of the present invention will be described by way of example with reference to the accompanying drawings, in which.

For clarity, only those elements useful to the understanding of the invention have been shown in the drawings. moreover, the same elements are referred to in the different drawings by the same references.

DETAILED DESCRIPTION

A feature of the present invention is to perform a modulation of a signal to be transmitted on several frequencies $f'_i$, each of which defines a transmission channel. It is thus possible to select, according to the network impedance between two modems desiring to communicate, the transmission frequency which is least attenuated.

If the transmission is to be performed in FSK modulation, the circuit according to the invention performs an overmodulation, on at least one frequency $f'_i$, of a data flow Tx already modulated by frequency shift keying (FSK). This overmodulation shifts the central frequency $f_c$ of the two frequencies $f_a$ and $f_b$ of the FSK modulation towards at least one higher frequency $f_i$ while respecting the distance $\Delta f = f_b - f_a$ of the FSK modulation.

In the case of an ASK modulation, a binary data flow can be directly modulated on at least one frequency $f'_i$ by the allocation circuit according to an embodiment of the invention. If the allocation circuit is associated with an existing modem, it performs an overmodulation, on at least one frequency $f'_i$, of a signal already modulated by amplitude shift keying. This overmodulation shifts the carrier $f_c$ of the ASK modulation towards at least one higher frequency $f_i$.

Figure 1:
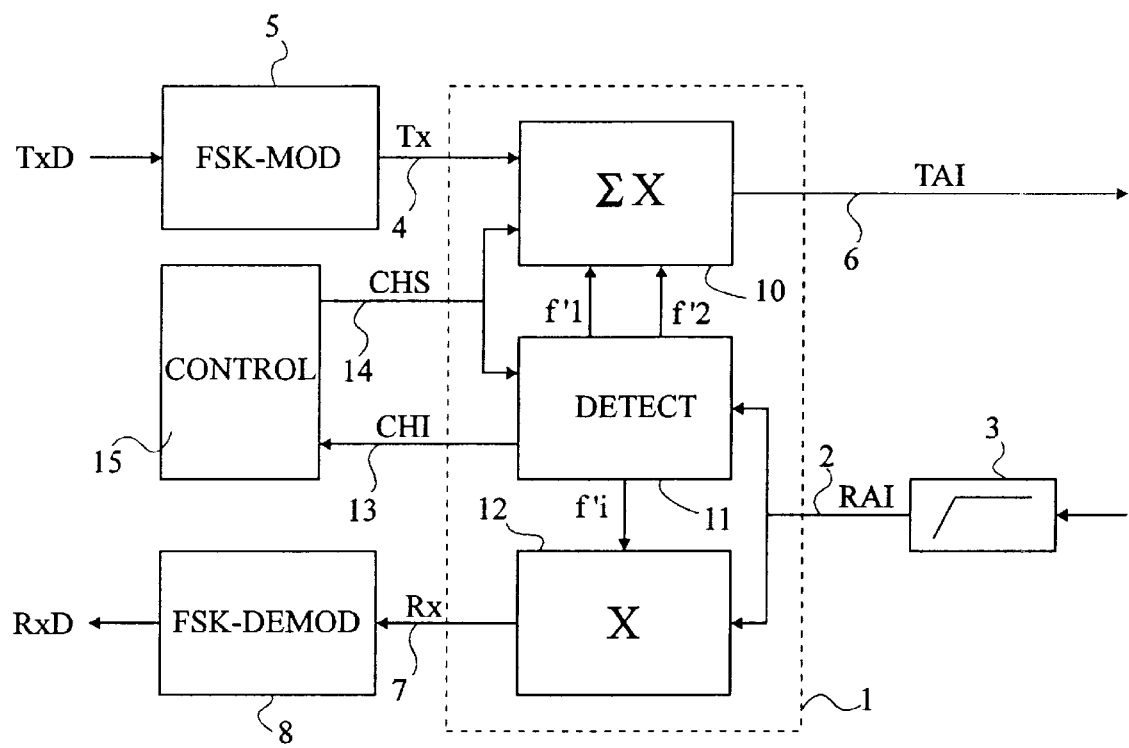
FIG. 1 shows a circuit for transmitting data modulated by frequency shift keying equipped with a circuit for allocating a channel according to an embodiment of the invention.

FIG. 1 shows a first embodiment of a circuit for allocating a transmission channel to a transmission of data modulated by frequency shift keying.

Allocation circuit 1 is interposed between an electric network, constituting a medium of transmission by carrier current, and the modulator/demodulator itself.

A first input terminal 2 of circuit 1 receives a signal RAI extracted from the network by means of an interface 3 that suppresses the high-voltage and low-frequency component which corresponds to the carrier supplied by the electric supply.

A second input terminal 4 of circuit 1 receives a signal to be transmitted Tx. In the example shown, this signal Tx is a signal modulated by frequency shift keying by a modulator $FSK_{13}$ MOD 5. The modulation performed by circuit 1 is applied to this signal Tx, for issuing, on a first output terminal 6 of circuit 1, a signal TAI to the electric network.

A second output terminal 7 of circuit 1 issues a flow of received data Rx from the signal RAI received. If signal RAI is an FSK modulated signal, signal Rx is modulated by frequency shift keying again and is sent to a demodulator $FSK_{13}$ DEMOD 8.

Circuit 1 includes a modulation device 10, on at least one high frequency $f_i$ defining a transmission channel, of the signal Tx to be transmitted. If, as is shown, the input 4 of circuit 1 is connected to the output of an FSK modulator 5, signal Tx already is an FSK modulated signal. The device 10 then shifts the central frequency $f_c$ of the FSK modulation towards at least one high frequency $f_i$ while respecting the distance $\Delta f$ between the two frequencies $f_a$ and $f_b$ of the FSK modulation.

Circuit 1 also includes a device 11 for selecting a transmission channel among several modulation frequencies $f'_i$ that it generates. Circuit 1 further includes a demodulation device 12 for restoring a signal Rx of the same type as signal Tx. If signal Rx is an FSK modulated signal, device 12 shifts the high frequency $f_i$ of signal RAI towards the central frequency $f_c$ of the FSK modulation. If signal Rx is an ASK modulated signal, device 12 shifts the high frequency $f_i$ of signal RAI towards the carrier of the original ASK modulation. If, conversely, signal Rx is a binary data flow, device 12 directly restores this binary data flow.

Circuit 1 issues a single high frequency $f'_i$ corresponding to the transmission channel selected at the demodulation device 12. Conversely, it issues to overmodulation device 10 all the frequencies $f'_i$ it generates, here two frequencies $f'_1$ and $f'_2$, to allow a transmission on all transmission channels, at least at the beginning of each communication.

A characteristic of the present invention is that the allocation of a transmission channel between two modems, respectively transmitter and receiver of a transmission, is performed, by the receiver modem, according to the attenuation undergone by different channels carrying the same data flow Rx on the signal TAI transmitted by the transmitter modem.

The signal TAI transmitted by a modem is constituted, at least at the beginning of each comunication, by several identical FSK modulated data flows having different central frequencies $f_1$ and $f_2$.

When a transmitter modem wants to transmit a binary data flow TxD, this flow is modulated by frequency shift keying by its FSK modulator 5. Signal Tx is overmodulated, within device 10, by being multiplied by the different high frequencies $f'_1$ and $f'_2$ issued by device 11, at least at the beginning of each communication. The results of these multiplications are added, or mixed, as will be seen further on in conjunction with FIG. 4, to constitute signal TAI. Signal TAI thus includes, at least at the beginning of each commnication, two identical binary data flows with different central frequencies $f_1$ and $f_2$. Attention will be paid to keeping the distances between the high frequencies $f'_1$ and $f'_2$ generated by circuit 11 higher than the distance $\Delta f$ between the two frequencies $f_a$ and $f_b$ of the FSK modulation.

The signal RAI received by a receiver modem at the beginning of a communication thus includes all these identical data flows. But, depending on the frequencies $f_i$ at which the different flows are transmitted, they will be more or less attenuated according to the network impedance between the two modems.

The device 11 of the receiver modem selects, among the freuencies $f_i$, the one it best receives. In other words, the device 11 of a receiver modem selects, among all the transmission channels of the installation, the one for which the data flow contained in the signal RAI it receives is least attenuated. As soon as it has selected a transmission (reception) channel, it supplies demodulation device 12 with the frequency $f'_i$ which corresponds to this channel. Thus, the dedulatLor 12 is configured on the channel it best receives from the transmitter modem. It then restores the data flow Rx of this channel as will be seen hereafter in conjunction with FIG. 5 and transmits it to FSK deoodulator 8.

An advantage of the present invention is that it enables allocation of the best possible channel to the communication.

Another advantage of the invention is that this allocation is performed automatically.

To enable, on the transmitting side, a configuration of allocation circuit 1 according to the channel selected, selection device 11 issues, on a third output terminal 13 and for a digital circuit or processor 15 for controlling the modem, a signal CHI indicating the channel selected. Further, circuit 1 receives, on a third input terminal 14, a signal CHS issued by control processor 15 and for forcing the allocation of a modulation channel. In other words, according to the state of signal CHS, device 10 uses either all the frequencies $f'_i$ generated by device 11 to establish the communication or a single one of these frequencies $f'_i$ when the communication is established. For this purpose, device 10 includes, as will be seen in conjunction with FIG. 4, means, for example logic, for switching the inputs of its mixer. Signal CHS is also sent to device 11 to force the high frequency $f'_i$ that it issues to device 12.

When wanting to send a message, a transmitter modem starts by transmitting a frame for establishing the communication on the network. The role of this frame is to enable the addressed modem to allocate a channel to the comunication.

When no communication is present on the network, all the modems in the installation are set in a scanning mode in which they monitor the appearance of a transmission.

Figure 2:
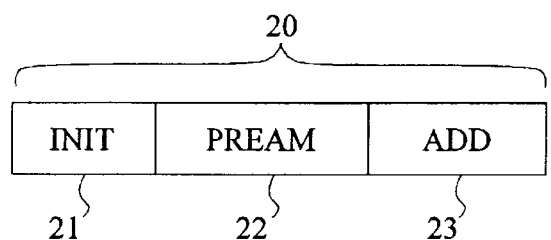
FIG. 2 shows a frame for establishing a comunication according to an embodiment of the invention.

FIG. 2 shows an example of a frame 20 for establishing a cunication according to the invention.

This frame 20 is transmitted by a transmitter modem and is overmodulated on all the high frequencies $f'_i$ (here, $f'_1$ and $f'_2$) which are issued, by its device 11, to its device 10. Thus, the signal TAI transmitted during a frame 20 for establishing a communication is constituted by several identical FSK modulated data flows having different central frequencies $f_i$.

Frame 20 begins with a first pseudo-random sequence INIT 21. This sequence 21 enables the devices 11 of the other modems connected to the network to select, in their signal RAI (corresponding to the signal TAI transmitted by the transmitter modem), the frequency $f_i$ it best receives. In other words, these devices 11 select, among all the transmission channels of the installation, the one for which the signal contained in signal RAI is the least attenuated. As soon as they have selected a transmission channel, the devices 11 supply the demodulation devices 12 with which they are respectively associated with the frequency $f'_i$ corresponding to this channel. The duration of sequence INIT 21 is set according to the time required for this selection by the devices 11 of the installation modems. Thus, at the end of sequence INIT 21, all the devices 12 of the installation modems are configured on the channel that they best receive from the transmitter modem.

Sequence INIT 21 is followed by a second sequence PREAM 22 containing a predetermined code for identifying a frame for establishing a communication. This sequence 22 is used by the modems which receive it for determining that they are receiving a frame 20.

Sequence PREAM 22 is followed by a third sequence ADD 23 containing the addresses of the transmitter modem and of the receiver modem to which the message that the transmitter modem is about to send is addressed. The transmitter modem is switched to a reception or scaning mode as soon as it has finished transmitting frame 20.

Sequences PREAM 22 and ADD 23 are interpreted by processor 15 for controlling the modem which has the function, among others, of exploiting the information contained in data flow RxD.

If a modem of the installation recognizes its address in sequence ADD 23, its processor 15 switches it to a transmission mode so that it indicates to the transmitter modem the transmission channel it wishes to allocate to the communication.

This indicating is performed by the receiver modem by itself transmitting a frame 20 for establishing a communication. However, this frame is overmodulated only on the high frequency $f'_i$ which has been selected by its device 11. For this purpose, processor 15 uses the indication of the selected channel which it gets from the signal CHI issued by the device 11 with which it is associated. It then indicates to device 10, by means of signal CHS, this selected channel.

In the sequence ADD 23 of its frame 20, the receiver modem indicates its own address as well as the address of the transmitter modem to which the frame 20 is sent.

Thus, the transmitter modem only receives a frame 20 on its central frequency $f_i$ (here, $f_1$ or $f_2$). Its device 11 will thus select the channel associated with this frequency since the level of the other channels is zero. Its device 12 is thus configured on the channel used for the answer of the receiver modem. As for the receiver modem, the processor 15 of the transmitter modem forces its circuit 1, by means of signal CHS, to now transmit only on the selected channel.

This channel is now allocated to the ounication between the two modems. The transmitter modem can then send its message in a conventional way.

The fact of being able to force, by means of processor 15, the transmission channel enables, according to the invention, a personalized configuration of the different circuits 1 to allow the presence of several different simultaneous communications on the same network.

Such a characteristic makes it possible for any modem to communicate with any other modem on a channel even if one or several of the other channels are used.

Indeed, when a first transmission appears on the network, all modems (except the transmitter modem of the transmission) detect the transmission. The modems which are not addressees of the first communication are further maintained in a scanning state. As soon as the modem receiving the first transmission transmits, as an answer, its frame 20 for establishing the commuication, the respective processors of the other modems are then able, by means of signal CHI, to determine which channel is used. Since the addresses 23 of the two modems (transmitter and receiver) of the first cunication are contained in frame 20, the other modems also know which two modems are busy.

It is then provided that all the modems which are not addressees of the first communication force, by means of signal CHS, their device 11 not to supply the device 12 to which it is associated with the frequency used by the first comunication. Signal CHS then also forces the allocation of at least one idle channel to a second communication transmitted by any idle modem by forcing the overmodulation frequency of its device 10.

However, if the installation only uses two channels, that is, if the devices 11 of the circuits 1 of the modems only generate two frequencies $f'_1$ and $f'_2$, it will not be possible to select the best possible channel for this second communication.

Conversely, if more than two channels are provided in the circuits 1, an automatic allocation of the best channel among those which are idle can be maintained. In this case, signal CHS does not impose a given channel but indicates the busy channel(s) so that circuit 1 transmits the frame 20 relative to the second communication, on the idle channels only.

For this purpose, signal CHS is, preferably and in the case where the circuits 1 have more than two channels, a signal over several bits. The number of bits is, for example, equal to the number of channels.

It is however necessary for all modems to be able to determine the end of a transmission which is not addressed to them so that circuit 1 may again consider the channel which was used for this transmission as an idle channel.

For this purpose, it is provided to include the time length of the message to be sent by a given modem in the frame 20 for establishing the communication, for instance behind the address sequence 23.

It is then provided, according to the invention, that the processors of the modems to which no transmission is sent position their signal CHS only when they have decoded the length of the message about to be sent by the transmitter modem. Thus, these processors can reposition their signal CHS when the duration of the message is over. The channel then is, again, considered as idle.

Attention will be paid to increasing the duration of the message, by a modem to which it is not addressed, with the duration required for the transmission, and by the modem to which the communication is sent, with the frame 20 it returns to the transmitter modem.

The only functional requirement for establishing simultaneous comunications on the different channels is that no modem must attempt to establish a second communication by transmitting a frame 20 while the first cmmnication is being established. If this case should happen, the transmitter modem of the first transmission risks not to select the right channel which has been indicated by the receiver modem of this first transmission since it then receives several channels. This requirement is met according to the invention. Indeed, if a modem to which the transmission is not addressed, associated with the first frame 20, memorizes the length of the communication anticipated during this first frame, it is only upon reception of the second frame that it identifies the channel selected. It thus remains in the receive mode during the two frames 20.

An advantage of the present invention is that it avoids for the modems to which a communication is not addressed to consider a channel as busy while the cmunication will not be established, for example if the receiver modem is not connected or if it receives no channel with a sufficient level.

If a transmitter modem wants to send the same message to several receiver modems, the frame 20 it transmits includes a code (not shown) indicating a communication to a group. When a receiver modem receives a frame 20 addressed to it and which includes a group transmission code, it will delay its switching to the transmitting mode by a specific predetermined time. It thus remains in the scanning mode during this tire and thus cannot send its answer frame 20 if another modem is sending one. The role of the delay allocated, in this case, to each modem, is to avoid for two receiver modems to switch at the same time to the transmitting mode. The transmitter modem will thus receive as many frames 20 as there are modems receiving the transmission. Each frame 20 indicates to this transmitter modem a transmission channel, which enables it to configure its overmodulation device on the channels chosen by the receiver modems. Of course, several receiver modems can have selected a same channel.

An advantage of the present invention is that it allows using several transmission channels for the same communication to several modems while respecting the selection of the best transmission channel by the receiver modems. Indeed, as a transmitter modem transmits frame 20 on all idle channels, each receiver modem can allocate to this transmission the channel it best receives among the idle channels.

Figure 3:
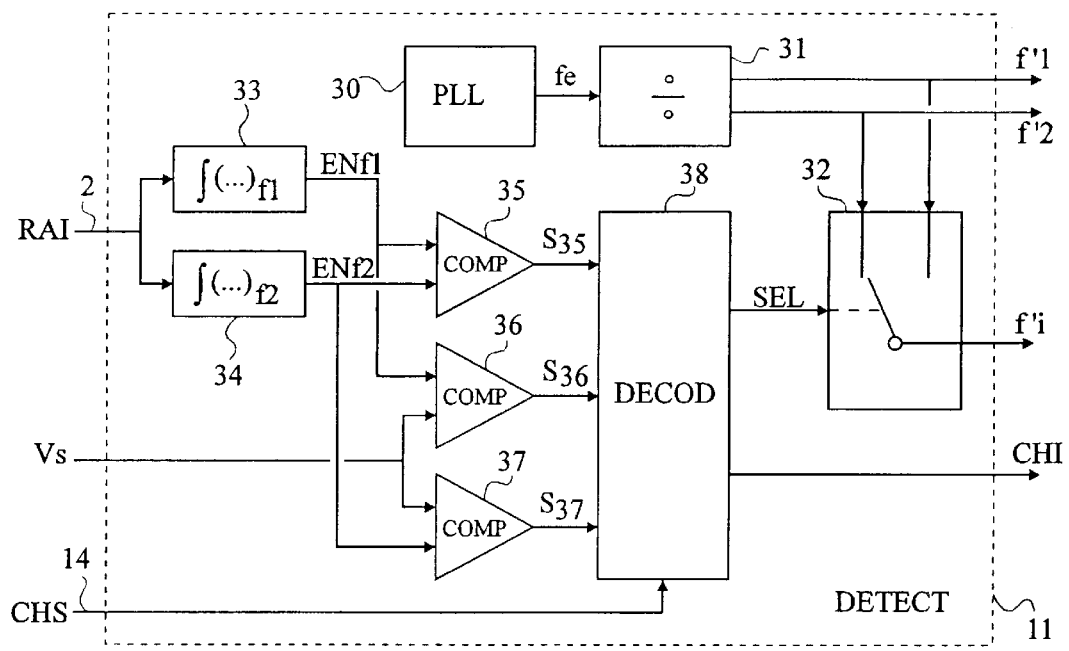
FIG. 3 shows an embodiment of a device for selecting the transmission channel of an allocation circuit as shown in FIG. 1.

FIG. 3 shows an embodiment of a selection device 11 of an allocation circuit 1 as shown in FIG. 1.

As it has been observed above, this device 11 generates the high frequencies $f'_i$ (here, $f'_1$ and $f'_2$) for device 10 and selects the best channel to supply device 12 with the corresponding high frequency $f'_1$ or $f'_2$.

Device 11 includes a phase-locked loop (PLL) 30 which issues an input frequency $f_e$ to a frequency divider 31. Frequency divider 31 is, preferably, a digital divider and is dimensioned to issue as many frequencies $f'_i$ as there are channels provided for circuit 1. The frequency $f_e$ issued by PLL 30 is selected to be a multiple of each of the frequencies $f'_i$ that are desired to be obtained. The frequencies $f'_1$ and $f'_2$ are issued to device 10 and to a switch 32 for selecting, according to an order value SEL it receives, that of frequencies $f'_1$ or $f'_2$ which is issued to device 12.

The signal RAI received by circuit 1 is sent to a number of integrators (here, two) 33 and 34 equal to the number of channels of circuit 1. These integrators 33 and 34 issue the energy levels $EN_{f1}$ and $EN_{f2}$ of the respective data flows present on each of the channels. These energy levels $EN_{f1}$ and $EN_{f2}$ are sent to two inputs of a first comator COMP 35. The output signal $S_{35}$ of this comparator 35 enables to identify the channel which is received with the highest energy level.

Preferably, egergy levels $EN_{f1}$ and $EN_{f2}$ are also sent to secondary comparators COMP, respectively 36 and 37, which have the function of comparing each level $EN_{f1}$ and $EN_{f2}$ to a threshold value Vs. This prevents a communication from being established if all the channels are received with too low an energy level.

It should be noted that the higher the number of frequencies $f'_i$ generated by the device 11, the less risk that communication cannot be established.

The outputs $S_{35}$, $S_{36}$ and $S_{37}$ of comparators 35, 36 and 37 are sent to a logic circuit DECOD 38 also receiving signal CHS. The role of circuit 38 is to issue, according to the respective states of the different signals $S_{35}$, $S_{36}$, $S_{37}$ and CHS, the signal SEL for controlling switch 32. The practical implementation of logic circuit 38 is within the abilities of those skilled in the art according to the functional indications given in the present description.

If the two signals $S_{36}$ and $S_{37}$ are in a state indicating that no channel is received with a sufficient level, the frame 20 received cannot be demodulated since no frequency $f'_i$ is issued to the device 12 of the receiver modem. Thus, this modem transmits no answer frame 20. As the transmitter modem waits for this frame 20 to start sending its message, it knows, after a predetermined time, that no channel can adequately transmit the message to the receiver modem.

An advantage of the present invention is that it gives a quick indication (in about the time of two frames 20) to the transmitter modem whether it will be able to send a message to a given modem that can receive it correctly. Thus, a modem which must transmit several different messages to several different modems (for example, the central station of a home automation installation) need not waste time transmitting a message which will not be received correctly and which it should, in conventional circuits, transmit again. It can thus attempt to transmit another message to another modem and retry transmitting to the first modem later.

Integrators 33 and 34 are implemented in a conventional fashion. The only imperative is that the input filter included in each integrator 33 and 34 be a band-pass filter with a bandwidth substantially corresponding to the distance $\Delta f$ between the two frequencies $f_a$ and $f_b$ of the FSK modulation and being centered on the frequency $f_1$ or $f_2$ to which the integrator is associated.

It should be noted that the above-discussed device 11 can be strictly unchanged if signal Tx is an ASK modulated signal. For this purpose, the carrier frequency of signal Rx has to be included between the frequencies $f_a$ and $f_b$ of the FSK modulation for which the device 11 is provided. Indeed, the frequencies $f_1$ and $f_2$ of the transmission channels will then be included in the pass-bands of integrators 33 and 34.

If signal Tx readily is the binary data flow, the integrators are sized to calculate the energy levels received in the vicinity of the frequencies, respectively $f'_1$ and $f'_2$.

Figure 4:
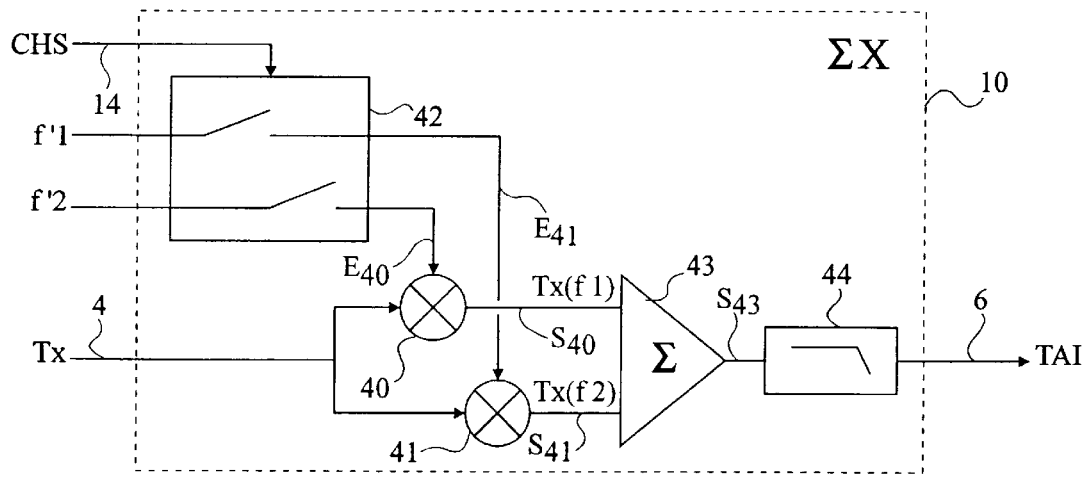
FIG. 4 shows an embodiment of a modulation device of an allocation circuit as shown in FIG. 1.

FIG. 4 shows an embodiment of a modulation device 10 of an allocation circuit 1 as shown in FIG. 1.

Device 10 includes two multipliers 40 and 41 receiving, on a first input, signal Tx. A second input $E_{40}$ and $E_{41}$ of each multiplier receives one of the frequencies $f'_1$ or $f'_2$ generated by device 11. These frequencies $f'_1$ and $f'_2$ are issued to inputs $E_{40}$ and $E_{41}$, via a switching circuit 42. Circuit 42 is controlled by signal CHS.

The outputs $S_{40}$ and $S_{41}$ of multipliers 40 and 41 issue the FSK modulated data flow Tx centered, respectively, on frequencies $f_1$ or $f_2$. The new central frequencies $f_1$ and $f_2$ of the FSK modulated data flows correspond to the central frequency $f_c$ of FSK modulator 5 multiplied by the frequencies, respectively $f'_1$ and $f'_2$. Outputs $S_{40}$ and $S_{41}$ are sent to inputs of a mixer 43. The output $S_{43}$ of mixer 43 thus issues, when the two frequencies $f'_1$ and $f'_2$ are sent to inputs $E_{40}$ and $E_{41}$, a signal including twice the data flow Tx centered on different frequencies $f_1$ and $f_2$. When a single frequency $f'_1$ or $f'_2$ is selected by means of signal CHS, output $S_{43}$ issues the data flow Tx centered on frequency $f_1$ or $f_2$, respectively.

The signal issued by mixer 43 flows across a low-pass filter 44 for eliminating the possible high-frequency noise. The frequency of filter 44 is chosen to be higher than the maxim frequency of frequencies $f_1$ and $f_2$ plus the distance $\Delta F$ of the FSK modulation. The output of filter 44 constitutes signal TAI.

If signal Tx is an ASK modulated signal or a binary data flow, the constitution of device 10 is unchanged.

Figure 5:
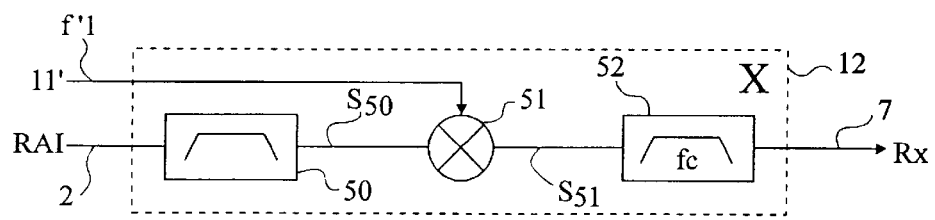
FIG. 5 shows an embodiment of a demodulation device of an allocation circuit as shown in FIG. 1.

FIG. 5 shows an embodiment of a demodulation device 12 for restoring a flow of received data Rx centered on the central frequency $f_c$ of FSK demodulator 8 (FIG. 1) of circuit 1.

Signal RAI preferably crosses a first band-pass filter 50 centered on the frequency $f_i$ corresponding to the channel selected by device 11 and having a pass-band corresponding to the distance in frequency $\Delta f$ of the FSK modulation. The control of filter 50 by device 11 has not been shown in the drawings.

The output $S_{50}$ of filter 50 is sent to a first input of a multiplier 51 having a second input which receives the frequency $f'_i$ issued by device 11. Multiplier 51 thus behaves as a demodulator of the signal transmitted with a central frequency $f_i$. Thus, at the output of multiplier 51, the frequency spectrum includes frequencies $f_a$ and $f_b$, or $f_c-\Delta f$ and $f_c+\Delta f$, of the FSK modulation.

As an alternative, filter 50 has a pass-band which includes all the frequencies likely to be transmitted by the different channels. In other words, its pass-band is then comprised between the smallest of frequencies $f_i$, minus half the distance in frequency $\Delta f$ of the FSK modulation, and the greatest of frequencies $f_i$, plus half the distance $\Delta f$. The frequency spectrum at the output of the multiplier includes, in this case, the frequencies $f_i-\Delta f$ and $f_i+\Delta f$ of all the channels present in signal RAI except the frequencies associated with the channel demodulated by frequency $f'_i$. The frequencies of this channel have become the frequencies $f_a$ and $f_b$, or $f_c-\Delta f$ and $f_c+\Delta f$, of the FSK modulation again.

The signal $S_{51}$ issued by multiplier 51 crosses a bandpass filter 52 having a pass-band corresponding to the frequencies $f_a$ and $f_b$ of the FSK modulation. Filter 52 thus eliminates all the data flows still centered on frequencies $f_i$. The output of filter 52 constitutes the signal Rx sent to FSK demodulator 8.

As for device 11, the above-described device 12 operates, with no modification, when signal Tx is in ASK modulation, provided that its carrier frequency is comprised between the frequencies $f_a$ and $f_b$ for which the circuit 1 has been sized.

As an alternative, filter 52 may be a low-pass filter having a cut-off frequency corresponding to the maximum frequency $f_b$ of the FSK modulation or the frequency of the FSK modulation.

The actual frequencies $f_a$ and $f_b$ of the FSK modulation are, preferably, comprised between 200 Hz and 10 kHz. Such a selection allows optimization of the operation of the FSK demodulator. Further, it makes the implementation of a band-pass filter of a high order in device 12 easier, since the central frequency $f_c$ is then relatively low.

Frequencies $f_1$ and $f_2$ are chosen to be high (for example between 80 and 150 kHz) with resect to the power supply frequency (50 or 60 Hz).

As a specific example of implementation, an allocation circuit 1 according to the invention can be implemented with frequency values indicated hereafter.

Frequencies $f_a$ and $f_b$ of the FSK modulator and demodulator are, for example, respectively 4.8 kHz and 6 kHz. The distance in frequency $\Delta f$ is thus 1.2 kHz and the central frequency $f_c$ is 5.4 kHz.

The cut-off frequencies of band-pass filter 52 of demodulation device 12 are, in this case, 4.8 kHz and 6 kHz, the filter being symmetrical.

For example, three frequencies $f'_1$, $f'_2$ and $f'_3$ generated by selection device 11 are selected. These frequencies are for example respectively 99 kHz, 110 kHz and 132 kHz. Frequency $f_e$ of PLL 30 is, for example, 3.960 MHz and thus corresponds to a multiple of 40, 36 and 30 of frequencies $f'_1$, $f'_2$ and $f'_3$, respectively.

The central frequencies obtained for the different channels correspond to the sum of the frequency $f'_1$, $f'_2$ or $f'_3$ corresponding to the channel and of the central frequency $f_c$ of the actual FSK modulation. Three channels having, respectively, central frequencies $f_1$, $f_2$ or $f_3$ of 104.4 kHz, 115.4 kHz and 137.4 kHz are obtained.

These channels effectively meet the condition that the modulated signals that they transmit must not overlap. Indeed, the data are transmitted as samples of portions of frequencies of 103.8 and 105 kHz for the first channel, of 114.8 and 116 kHz for the second channel and of 136.8 and 138 kHz for the third channel.

The band-pass filters of the integrators of selection device 11 have a bandwidth of 1.2 kHz and are centered, respectively on the frequencies of 104.4 kHz, 115.4 kHz and 137.4 kHz. The cut-off frequency of low-pass filter 44 of modulation device 10 is, for example, 140 kHz.

According to a second embodiment not shown, modulation device 10 (FIG. 1) and FSK modulator 5 can be replaced by digital FSK modulators of a same data flow TxD, directly on at least two different central frequencies $f_i$. In this case, selection device 11 does not have to generate high frequencies $f'_i$. The digital outputs of the FSK modulators are each converted into an analog signal. These analog signals cross a switch controlled by signals then delivered by the selection circuit instead of the frequencies $f'_i$.

An advantage of the present invention is that it optimizes the operation of modems using the electric network as a transmitting medium by authorizing the use of different central frequencies $f_i$ of the FSK modulated data flow to allow the simultaneous presence of different communications on the same network.

Another advantage of the present invention is that it requires no modification to the structure of the FSK modulators and demodulators. The circuit according to the invention can thus be used in an existing installation. An allocation circuit 1 is installed between each modem and the electric network and the software of digital modem control processor 15 is appropriately adapted.

Another advantage of the present invention is that allocation circuits including different numbers of channels are perfectly compatible with one another. Indeed, if two allocation circuits have at least one common frequency $f'_i$, this is enough for them to enable a comunication between the two modems with which they are respectively associated.

It can also be provided that the allocation circuit 1 according to the invention be made programmable by the user. Indeed, if divider 31 and the filters of integrators 33 and 34 of device 11 are made programmable, this is enough for the user to be able to chose the channel frequency. If the other filters of circuit 1 are not programmable as well, the usable frequency range is however limited by the cut-off frequency of low-pass filter 44 of device 10.

Of course, the present invention is likely to have many alterations and modifications which will appear to those skilled in the art. In particular, each of the components described can be replaced by one or several elements performing the same function.

Moreover, the present invention applies whether the modulation used is an FSK or an ASK modulation and whatever the type of binary data and the structure of the message to transmit may be.

While some of the former explanations have been disclosed, for clarity, in terms sometimes corresponding to an analog operation, it should be clear to those skilled in the art that all the elements of the allocation circuit according to the present invention which can process digital signals can correspond, in practice, to software implementations.

Having thus described at least one illustrative embodiment of the invention, various alterations, modifications, and improvements will readily occur to those skilled in the art. Such alterations, modifications, and improvements are intended to be within the spirit and the scope of the invention. Accordingly, the foregoing description is by way of example only and is not intended to be limiting. The invention is limited only as defined in the following claims and the equivalent thereto.

What is claimed is:

1. A circuit for communicating binary data on an electric network comprising:

a first modem having a modulator, and a demodulator;

a digital circuit for controlling the first modem and interpreting the binary data; and an allocation circuit, coupled to the first modem and the digital circuit, for allocating a transmission channel to a communication, the allocation circuit including means for selecting, from a plurality of transmission channels, an idle transmission channel;

wherein the allocation circuit includes a selection device that selects the transmission channel to allocate based upon the transmission channel having a best transmission level from a plurality of idle transmission channels, selection being performed when the first modem operates as a receiver modem during a frame for establishing a communication sent on the plurality of idle transmission channels by a transmitter modem, the selection device supplying the digital circuit with a signal indicating the transmission channel.

2. The circuit of claim 1, wherein:

the selection device controls a modulation device that modulates, on at least one frequency selected from a plurality of frequencies which define the plurality of transmission channels, a first signal already modulated by the modulator of the first modem; and the selection device controls a demodulation device that demodulates a second signal that is received on the transmission channel.

3. The circuit of claim 1, wherein the frame for establishing the communication includes a first sequence containing a duration of a message that is to be sent by the transmitter modem.

4. The circuit of claim 3, wherein the frame for establishing the communication further includes a second sequence containing respective addresses of the transmitter modem and of at least one modem to which the frame is addressed.

5. The circuit of claim 4, wherein the circuit, upon receiving the frame for establishing the communication which was addressed to it, transmits an answer frame to the transmitter modem, the answer frame being transmitted only on the transmission channel and having sequences similar to the frame for establishing the communication.

6. The circuit of claim 3, wherein the frame for establishing the communication begins with a pseudo-random sequence having a predetermined duration selected according to a duration required for selection of the transmission channel by the allocation circuit, the pseudo-random sequence being followed by a predetermined sequence enabling the digital control circuit to identify the frame as a frame for establishing a communication.

7. The circuit of claim 3, wherein the digital circuit supplies the allocation circuit with a configuration signal indicating which of the plurality of transmission channels are idle and which of the plurality of transmission channels are busy.

8. The circuit of claim 7, wherein the digital circuit assumes that an allocated transmission channel becomes idle at the end of the duration contained in the frame which has established the communication on the allocated transmission channel.

9. A circuit for communicating binary data between a first modem and a second modem that are coupled to an electric network, the first modem having a first modulator and a first demodulator, the circuit comprising:
a first input terminal to receive a first signal based on a first communication over the electric network from the second modem;
a second input terminal to receive a second communication from the first modulator;
a first output terminal to transmit a second signal over the electric network to the second modem, the second signal being based on the second communication;
a second output terminal to transmit the first communication to the first demodulator;
an allocation circuit, coupled to the first and second input terminals and the first and second output terminals, to allocate a first transmission channel to the first communication, the first transmission channel being allocated from a plurality of transmission channels of the electric network, each transmission channel of the plurality of transmission channels being respectively defined by a respective frequency of a plurality of frequencies; and
a control circuit, coupled to the allocation circuit, to interpret the binary data and control the allocation circuit;
wherein the allocation circuit includes a selection circuit, coupled to the first input and the control circuit, to select the first transmission channel from the plurality of transmission channels, the first transmission channel being selected from at least one idle transmission channel of the plurality of transmission channels and having a highest transmission level of each at least one idle transmission channel that receives the first signal.

10. The circuit of claim 9, wherein the selection circuit selects the first transmission channel from each at least one idle transmission channel that receives the first signal during a frame for establishing the first communication.

11. The circuit of claim 10, wherein the selection circuit sends an indication signal to the control circuit indicating the first transmission channel.

12. The circuit of claim 10, wherein the selection circuit sends an indication signal to the control circuit indicating each at least one idle transmission channel of the plurality of transmission channels and each busy transmission channel of the plurality of transmission channels.

13. The circuit of claim 9, wherein the allocation circuit further includes a modulation circuit, coupled to the selection circuit, the second input terminal, and the first output terminal, to modulate the second communication on at least one respective frequency of the plurality of frequencies.

14. The circuit of claim 13, wherein:
the selection circuit sends an indication signal to the control circuit indicating each at least one idle transmission channel of the plurality of transmission channels and each busy transmission channel of the plurality of transmission channels;
the modulation circuit modulates the second communication on each respective frequency that respectively defines each at least one idle transmission channel to generate the second signal; and
the modulation circuit transmits the second signal over the electric network.

15. The circuit of claim 14, wherein:
the modulation circuit modulates a frame for establishing the second communication on each respective frequency that respectively defines each at least one idle transmission channel to generate a modulated frame for establishing the second communication; and
the modulation circuit transmits the modulated frame before transmitting the second signal.

16. The circuit of claim 15, wherein the frame for establishing the second communication includes an initial sequence having a duration that allows a second allocation circuit, coupled to the electric network and between the second modem and the electric network, to select a single idle transmission channel from each at least one idle transmission channel in common with the allocation circuit on which to receive the second signal prior to receiving the second signal.

17. The circuit of claim 16, wherein the duration of the initial sequence allows a plurality of allocation circuits, each coupled to the electric network and between the electric network a respective one of a plurality of modems, to select a single idle transmission channel from each at least one idle transmission channel in common with the allocation circuit on which to receive the second signal prior to receiving the second signal.

18. The circuit of claim 17, wherein the frame for establishing the second communication further includes a group code, following the initial sequence, indicating that at least two of the plurality of modems are to receive the second signal.

19. The circuit of claim 16, wherein the frame for establishing the second communication includes a sequence that identifies the frame for establishing the second communication.

20. The circuit of claim 16, wherein the frame for establishing the second communication includes a sequence that contains an address of the first modem and an address of the second modem when the second modem is to receive the second communication.

21. The circuit of claim 16, wherein the frame for establishing the second communication includes a sequence that indicates a length of the second communication.

22. The circuit of claim 16, wherein the frame for establishing the second communication further includes:
a second sequence, following the initial sequence, that identifies the frame for establishing the second communication;
a third sequence, following the second sequence, that contains an address of the first modem and an address of the second modem when the second modem is to receive the second communication; and a fourth sequence, following the third sequence, that indicates a length of the second communication.

23. The circuit of claim 13, wherein:

the selection circuit sends a first indication signal to the control circuit indicating the first transmission channel;

the selection circuit sends a second indication signal to the control circuit indicating each at least one idle transmission channel of the plurality of transmission channels and each busy transmission channel of the plurality of transmission channels; and the modulation circuit modulates the second communication on only the respective frequency that define s th e first transmission channel to generate the second signal when the second communication is responsive to the first communication.

24. The circuit of claim 13, wherein the allocation circuit further includes a demodulation circuit, coupled to the selection circuit, the first input terminal, and the second output terminal, to demodulate the first signal and transmit the first communication to the first demodulator.

25. The circuit of claim 9, wherein the allocation circuit further includes a demodulation circuit, coupled to the selection circuit, the first input terminal, and the second output terminal, to demodulate the first signal and transmit the first communication to the first demodulator.

26. A circuit for communicating binary data between a first modem and a second modem that are coupled to an electric network, the first modem having a first modulator and a first demodulator, the circuit comprising:

a first input terminal to receive a first signal based on a first communication over the electric network from the second modem;

a second input terminal to receive a second communication from the first modulator;

a first output terminal to transmit a second signal over the electric network to the second modem, the second signal being based on the second communication;

a second output terminal to transmit the first communication to the first demodulator;

an allocation circuit, coupled to the first and second input terminals and the first and second output terminals, to allocate a first transmission channel to the first communication, the first transmission channel being allocated from a plurality of transmission channels of the electric network, each transmission channel of the plurality of transmission channels being respectively defined by a respective frequency of a plurality of frequencies; and a control circuit, coupled to the allocation circuit, to interpret the binary data and control the allocation circuit;

wherein the first modulator is a frequency shift keying modulator and a frequengy distance between a first respective frequency of the plurality of frequencies and a second respective frequency of the plurality of frequencies is greater than a frequency distance between two frequencies of the frequency shift keying modulator.

27. A method of communicating between a first modem and a second modem using an electric network as a medium of transmission, the method comprising the steps of:

receiving an initial portion of a communication on a plurality of transmission channels, each of the plurality of transmission channels being defined by a respective frequency of a plurality of frequencies;

allocating a first transmission channel from the plurality of transmission channels to a remaining portion of the communication; and responding to the initial portion of the communication on the first transmission channel;

wherein the step of allocating includes a step of selecting the first transmission channel from the plurality of transmission channels according to a quality of transmission on each transmission channel of the plurality of transmission channels that receives the initial portion of the communication;

wherein the step of selecting includes steps of
(A) determining an energy level of transmission on each transmission channel of the plurality of transmission channels that receives the initial portion of the communication, and
(B) choosing the first transmission channel based on the first transmission channel having a highest energy level of transmission on each transmission channel of the plurality of transmission channels that receives the initial portion of the communication;

wherein the step of selecting is performed during a frame for establishing the communication; and wherein the method further comprises steps of
filtering the communication to remove a high voltage and low frequency component of the communication; and
demodulating the communication on the respective frequency that defines the first transmission channel.

28. The method of claim 27,further comprising a step of transmitting the communication to the first modem responsive to the step of demodulating.

29. The method of clam 28, wherein the step of responding to the initial portion of the communication includes steps of:

modulating a response to the initial portion of the communication on the respective frequency that defines the first transmission channel; and transmitting the response to the initial portion of the communication over the electric network.

30. The method of claim 29, wherein the communication is transmitted by the second modem and received by the first modem, the response to the initial point of the communication including a second frame for establishing the communication, the second frame for establishing the communication including a sequence indicative of and address of the first modem, and an address of the second modem.

31. The method of claim 30, wherein the second frame for establishing the communication further includes a sequence indicative of a length of the response.

32. A method of communicating between a first modem and a second modem using an electric network as a medium of transmission, the method comprising the steps of:

receiving an initial portion of a communication on a plurality of transmission channels, each of the plurality of transmission channels being defined by a respective frequency of a plurality of frequencies;

allocating a first transmission channel from the plurality of transmission channels to portion of the communication;

responding to the initial portion of communication on the first transmission channel;

indicating each busy transmission channel of the plurality of transmission channels and each idle transmission channel of the plurality of transmission channels;

selecting, responsive to the step of indicating, a first plurality of transmission channels on which to transmit a second communication, the first plurality of transmission channels including each idle transmission channel of the plurality of transmission channels;

modulating an initial portion of the second communication on each respective frequency of the plurality of frequencies that define each idle transmission channel; and transmitting the initial portion of the second communication over the electric network.

33. The method of claim 32, further comprising steps of:

modulating a frame for establishing the second communication on each respective frequency of the plurality of frequencies that define each idle transmission channel; and transmitting the frame for establishing the second communication over the electric network.

34. The method of claim 33, wherein the frame for establishing the second communication includes a first sequence indicative that the frame for establishing the second communication is a frame for establishing communication.

35. The method of claim 33, wherein the frame for establishing the second communication includes a sequence indicative of a length of the second communication.

36. The method of claim 33, wherein the second communication is from the first modem and the frame for establishing the second communication includes a sequence indicative of an address of the first modem and an address of the second modem when the second communication is directed to the second modem.

37. The method of claim 33, wherein the second communication is directed to a plurality of modems that are coupled to the electric network, and the frame for establishing the second communication includes a sequence indicative that the second communication is directed to the plurality of modems.

38. The method of claim 32, wherein the communication includes a frame for establishing the communication, the frame for establishing the communication having a sequence indicative of a length of the communication, and the method further comprises a step of:

presuming the first transmission channel becomes idle after a time corresponding to the length of the communication.

39. A circuit for communicating data between a plurality of modems including a first modem, a second modem, and a third modem, each of the plurality of modems being coupled to an electric network, the circuit comprising:

means, coupled to the first modem and the electric network, for simultaneously communicating with the second modem and the third modem over a plurality of transmission channels, wherein the means for simultaneously communicating includes allocation means, coupled to the electric network and the first modem, for allocating a first transmission channel to a first communication from the second modem, and control means, coupled to the allocation means, for interpreting data and controlling the allocation means, and wherein the allocation means includes selection means, coupled to the electric network and the control means, for selecting the first transmission channel from the plurality of transmission channels, the first transmission channel being selected from at least one idle transmission channel of the plurality of transmission channels and having a highest transmission level of each at least one idle transmission channel that receives the first communication.

40. The circuit of claim 39, wherein the allocation means further includes demodulation means, coupled to the selection means and the electric network, for demodulating the first communication and transmitting a demodulated signal based on the first communication to the first modem.

41. The circuit of claim 40, wherein the allocation means further includes modulation means, coupled to the selection means, the control means, and the electric network, for modulating a second communication between the first modem and the third modem and transmitting the second communication on at least one second transmission channel of the plurality of transmission channels.

42. The circuit of claim 41, wherein the control means includes means for informing the modulation circuit of which transmission channels of the plurality of transmission channels are idle, and the at least one transmission channel includes each of the plurality of transmission channels that are idle.

43. The circuit of claim 41, wherein the modulation means modulates a frame for establishing the second communication and transmits the frame for establishing the second communication on the at least one second transmission channel prior to transmitting the second communication.

44. The circuit of claim 39, wherein the selection means selects the first transmission channel during a frame for establishing the first communication.

* * * * *